Dec. 7, 1965   R. J. LANNEN   3,221,402
METHOD OF LINING BEARING IN CONNECTING
ROD AND PIVOT PIN CONNECTION
Original Filed Feb. 19, 1962
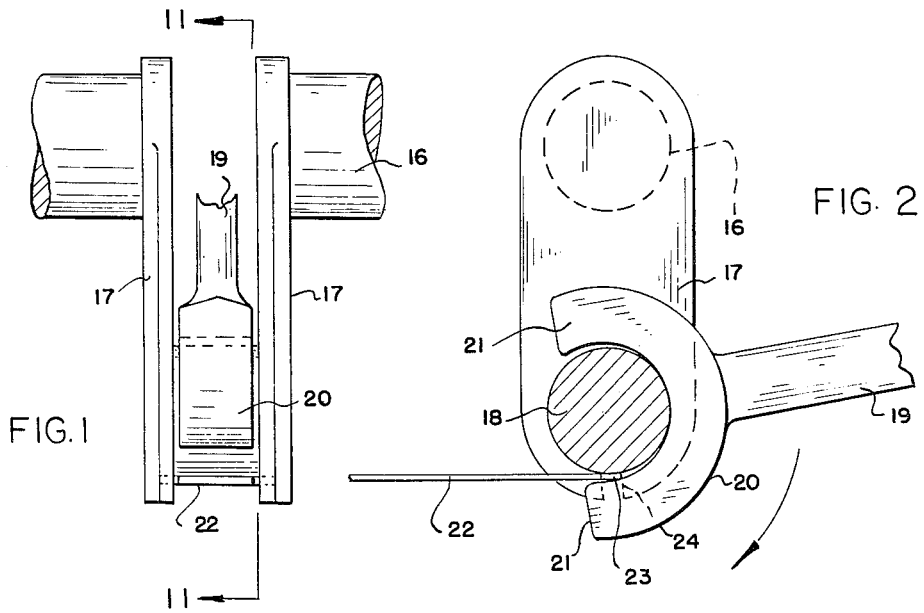
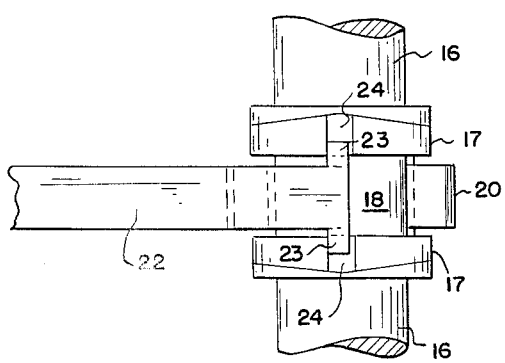
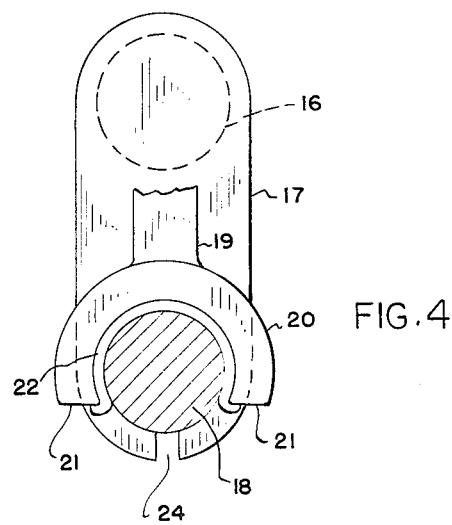
INVENTOR.
ROBERT J. LANNEN
BY
ATTORNEY United States Patent Office 3,221,402
Patented Dec. 7, 1965

3,221,402
METHOD OF LINING BEARING IN CONNECTING ROD AND PIVOT PIN CONNECTION
Robert J. Lannen, Detroit, Mich., assignor to Micro-Poise Engineering and Sales Company, Detroit, Mich., a partnership
Original application Feb. 19, 1962, Ser. No. 174,069. Divided and this application Oct. 17, 1963, Ser. No. 316,989
3 Claims. (Cl. 29—439)

This is a division of application Ser. No. 174,069, filed February 19, 1962, and relates to a method of assembling a connecting rod and pivot pin and particularly to pivotal joints between connecting rods and crank pins. The invention further relates to the interengagement of a bearing and a shaft journaled in the bearing, when for any reason it is not feasible to effect the interengagement by a relative sliding of said parts along their coincident axes.

A common type of crank-shaft has each of its crank-pins rigidly mounted upon and between a pair of parallel spaced arms, projecting rigidly and radially from the shaft. To apply a connecting rod to such a pin, it has been necessary to form the rod bearing in halves oppositely engaging the pin and bolted one to the other. If such a bearing includes a liner or bushing, the latter must be formed in semicylindrical halves rigidly fitted in the bearing halves.

An object of the invention is to form a connecting rod bearing with a gap proportioned in circumferential extent to permit lateral insertion of a crank-pin in the bearing, thus simplifying and expediting assembly or disassembly.

Another object is to reduce the requisite size of the bearing gap and to thus increase retention of a crank-pin in the bearing by forming the latter of an interior diameter predeterminedly exceeding the pin diameter, so that the inserted pin will have a certain clearance from the bearing, such clearance being then filled by a suitably proportioned elongated liner strip which is progressively thrust through the gap and into the clearance, being thus wrapped sufficiently around the crank-pin to establish the latter and the bearing in a proper coaxial relation.

Another object is to temporarily anchor the leading end portion of the liner strip so that a relative rotation of the connecting rod and crank-pin will exert the desired wrapping effect on the strip.

Another object is to so connect the inserted liner to the bearing that any relative rotation beween these parts will be avoided in use of the assembly.

Another object is to preform the liner strip with a pair of spaced flanges which will straddle the bearing as the strip is subjected to the wrapping effect, and will apply pressure to the bearing due to such effect, thus opposing any relative rotation of the inserted strip and bearing.

These and various other objects are attained by the method hereinafter described and illustrated in the accompanying drawings, wherein:

FIG. 1 is an elevational view of another modification of the invention.

FIG. 2 is a cross-sectional view of the same, taken on the line 2—2 of FIG. 1, showing an initial wrapping position for the liner strip.

FIG. 3 is a bottom view of the same.

FIG. 4 is a view similar to FIG. 1 but showing a final wrapping position for the liner strip.

FIG. 5 is a perspective view of a liner strip suited to the modification shown by FIGS. 1—4.

Referring now in greater detail to the invention as shown in FIGS. 1 through 5, a crank-shaft 16 rigidly carries a pair of spaced crank-arms 17, radially projecting from said shaft and rigidly mounting a crank-pin 18 upon and between their outer ends. A connecting rod 19 operates between the arms 17, being formed with a bearing 20 wherein the crank-pin is journaled. The bearing is formed with a gap circumferentially extending between the ends 21, such gap permitting the crank-pin to be entered, laterally thereof, in the bearing. When so entered, there is sufficient space between the pin and bearing to operatively accommodate a suitably curved liner 22. Prior to insertion in the bearing, the liner has the form of an elongated strip which, as shown, is rectilinear. In the initial step of assembly, a leading end of said strip is inserted in the bearing gap to tangentially engage with the pin 18, and a pair of lugs 23 oppositely laterally formed on said end are set into a pair of aligned notches 24 oppositely formed in the outer ends of the arms 17. With the crank-pin and shaft held stationary in any desired manner, the connecting rod and its bearing are now rotated in the direction of the arrow (FIG. 2), whereby the leading end 21 applies inward pressure to the liner, and the latter is progressively wrapped around the pin 18 and assumes the position appearing in FIG. 3. It is preferred to score the lugs 23 at their junctures with the liner strip so that they may be readily broken off when assembly is completed. Upon completion of the wrapping operation, the ends of the liner strip are outwardly bent against the bearing ends 21, preventing any rotation of the liner relative to the bearing. An advantage of the construction last described is that the liner strip is terminally held in place relative to the bearing without any reduction of the effective journal area of the crank-pin.

By lining the bearing subsequent to insertion therein of a crank-pin, there is obtained not only the antifriction effect usually derived from a liner, but the circumferential extent of the bearing gap is considerably reduced, with a corresponding increase in retention afforded the crank-pin.

What I claim is:

1. In a method of inserting a pivot pin in a connecting rod bearing and of lining the bearing, said pin being jointly mounted on the outer ends of a pair of spaced crank-arms, the bearing having a gap proportioned to afford insertion of the pin laterally thereof in the bearing, and the pin diameter being predeterminedly less than the internal diameter of the bearing to accommodate a liner, and such liner having the initial form of an elongated strip, the steps of inserting the pin in the bearing through said gap, and then attaching a leading end of said strip to the outer ends of the crank-arms to adapt the strip to wrap around the pin responsive to relative rotation of the pin and bearing, and detaching the wrapped strip from the outer ends of the crank-arms.

2. The method as set forth in claim 1, the outer ends of the crank-arms being formed with opposed notches in their end faces, and the liner strip having on its leading end a pair of oppositely projecting lugs, engageable in said notches to attach said leading end to said arms.

3. In the method as set forth in claim 2, the step of removing said lugs from the strip after completion of the claimed assembly.

References Cited by the Examiner
UNITED STATES PATENTS

| | | | |
|---|---|---|---|
| 360,663 | 4/1887 | Daniels | 29—439 X |
| 1,464,386 | 8/1923 | Ingram | 285—77 |
| 1,613,146 | 1/1927 | Volare | 74—588 X |
| 1,865,808 | 7/1932 | Abegg | 29—439 |
| 1,873,245 | 8/1932 | Abegg | 29—439 |

WHITMORE A. WILTZ, Primary Examiner.

THOMAS H. EAGER, Examiner.